July 25, 1967 R. J. MOLNAR ETAL 3,333,114
ELECTRONIC CONTROL SYSTEM FOR DRIVING AND
CLEARING AN INTEGRATING NETWORK
Filed Sept. 30, 1964
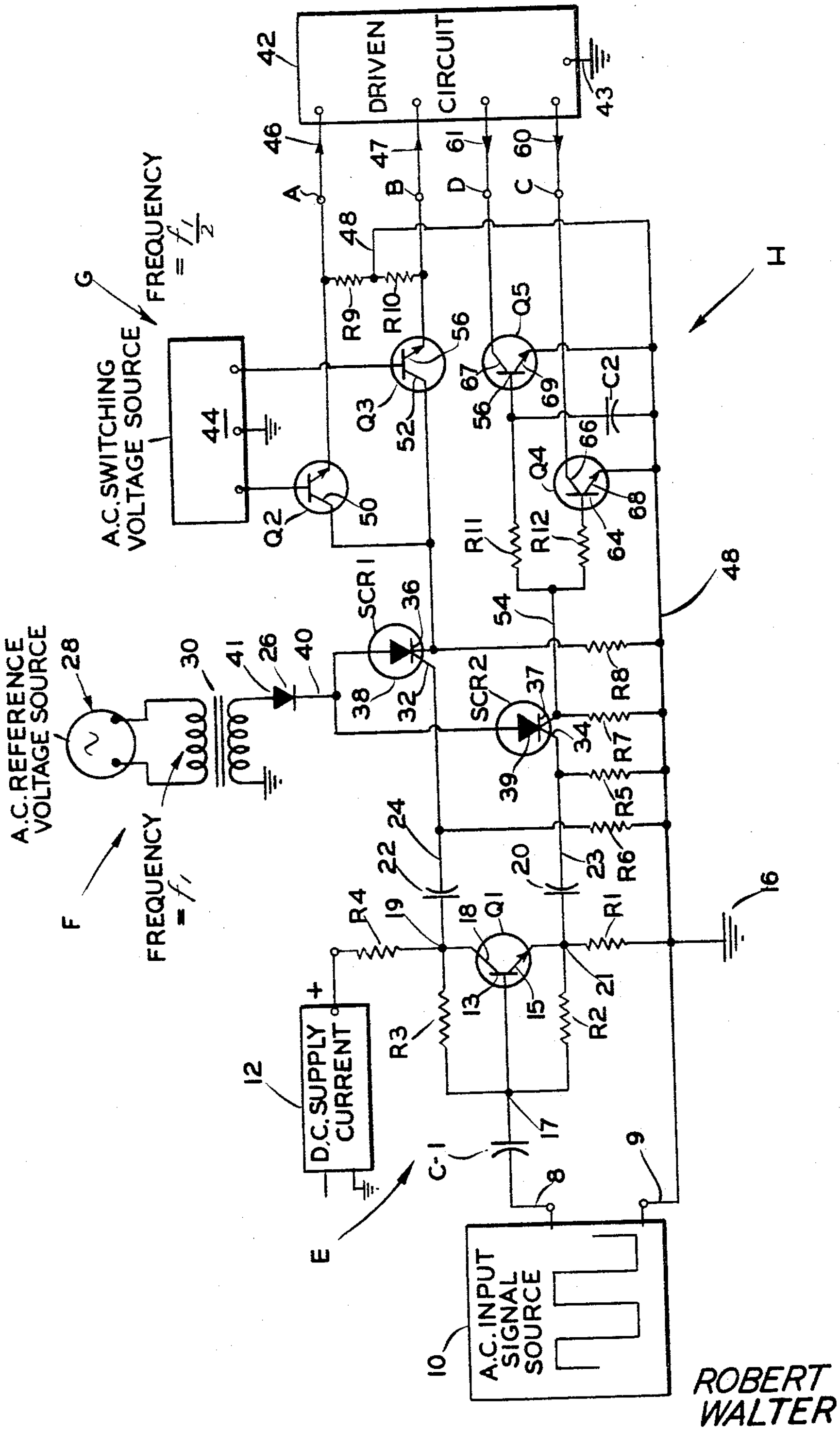
INVENTORS
ROBERT J. MOLNAR
WALTER PARFOMAK
BY
Constantine A. Michalos
ATTORNEY United States Patent Office 3,333,114

Patented July 25, 1967

3,333,114

ELECTRONIC CONTROL SYSTEM FOR DRIVING AND CLEARING AN INTEGRATING NETWORK

Robert J. Molnar, New York, and Walter Parfomak, Brooklyn, N.Y., assignors to The Bendix Corporation, Teterboro, N.J., a corporation of Delaware Filed Sept. 30, 1964, Ser. No. 400,534
16 Claims. (Cl. 307—88.5)

ABSTRACT OF THE DISCLOSURE

An electronic control system for selectively applying driving and clearing pulses to an integrating network in response to the magnitude and sense of a change in a measured quantity.

This invention relates to electronic control systems and particularly to an electronic alternating drive circuitry for a ring counter, a shift register, or any other system such as an integrating circuitry as provided in the copending U.S. application Ser. No. 411,803, filed Nov. 17, 1964, by Robert J. Molnar and Walter Parfomak, and assigned to The Bendix Corporation, and as used in a single transistorized comparator circuitry, as shown in the copending U.S. application Ser. No. 386,996, filed Aug. 3, 1964 by Robert J. Molnar and Walter Parfomak.

In addition, this invention provides for instantaneous and delayed clearing switching usually required by the circuitry of the copending U.S. application Ser. No. 535,745, filed Mar. 21, 1966, by Robert J. Molnar and Walter Parfomak, as a continuation in part as to all common subject matter of a U.S. application Ser. No. 467,391, filed June 28, 1965, by Robert J. Molnar and Walter Parfomak, for a Solid State Display With Electronic Drive Circuitry.

Therefore, this invention provides for a drive system wherein switching transistors are used to alternately open and close, at a predetermined frequency, for conducting therethrough a sequential train of drive pulses directed into two lines, one line receiving the even pulses, and the other line receiving the odd pulses or vice versa, depending upon the phase relationship of the pulses and the frequency of the switching transistors. In addition, this invention provides for a clearing system wherein clearing transistors are used for instantaneous and delayed clearing of the integrating circuitry.

Therefore, an object of this invention is to provide a simple electronic means of alternately feeding driving pulses to a pair of conductors, each connected to a different circuit for the purpose of alternately energizing the circuits and thus sequentially providing information to a driven circuitry.

Another object of the invention is to provide a solid state driving means for alternately driving a pair of circuits such as a fine and a coarse circuit provided in the copending U.S. application Ser. No. 535,745.

Another object of the invention is to provide novel solid state alternate driving means, as provided in the combination of a solid state means, for clearing either or both of the fine and coarse circuits such as disclosed in said copending U.S. application Ser. No. 535,745.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The only figure of the drawing shows an electronic circuit diagram of an alternate drive and clearing system embodying the invention.

Referring now to the drawing in detail, it will be seen that the overall circuit shown can be divided into four parts: a signal circuit E, a reference voltage supply circuit F; an alternating current switching circuit G; and, an output receiving or clearing circuit H.

The signal circuit E primarily comprises an input A.C. signal source 10 having output conductors 8 and 9 and which may effect a signal derived from a fuel meter for measuring fuel flow as provided in copending U.S. application Ser. No. 422,766, filed Dec. 31, 1964, by Robert J. Molnar and Walter Parfomak, or a tachometer for measuring r.p.m. of an airplane engine or a sensor such as a thermocouple for measuring the exhaust gas temperature of an engine; a D.C. supply source 12; and, a phase discriminator or split phase inverter transistor Q–1 receiving voltage from the D.C. supply source 12.

The transistor Q–1 is an NPN type having its base 13 connected to the output conductor 8 from the signal source 10 through a coupling capacitor C–1, its emitter 15 connected to the output conductor 9 of the signal source 10 and to ground 16 through a resistor R–1 and to a capacitor junction 17 through resistor R–2, and its collector 18 connected to the capacitor junction 17 through resistor R–3 and to the D.C. supply source 12 through resistor R–4. In addition, the emitter 15 and collector 18 are connected to the reference voltage supply F through D.C. blocking capacitors 20 and 22 by line conductors 23 and 24 and as herein more fully described. It should be noted that the line conductor 23 is connected to the ground 16 through a resistor R–5 and the conductor 24 is connected to the ground 16 through a resistor R–6.

The reference voltage circuit F primarily comprises: a rectifying diode 26, silicon controlled rectifiers SCR–1 and SCR–2; and, an A.C. reference voltage source 28 providing an alternating current having a frequency of $f_1$ applied through a coupling transformer 30.

The silicon controlled rectifier SCR–1 is connected by its gating terminal 32 to the signal circuit E, by the line conductor 24, through the capacitor 22 to the collector terminal 18 of the NPN transistor Q–1. In addition, the silicon controlled rectifier SCR–1 is connected by its gating terminal 32 to the ground 16 through the resistor R–6. The silicon controlled rectifier SCR–2 is connected by its gating terminal 34 to the signal circuit E, by the line conductor 23 through the capacitor 20 to the emitter terminal 15 of the NPN transistor Q–1. In addition, the gating terminal 34 of the silicon controlled rectifier SCR–2 is connected to the ground 16 through resistor R–5.

As shown, the silicon controlled rectifiers SCR–1 and SCR–2 are also connected, by their cathodes 36 and 37, to the ground 16 through resistors R–8 and R–7, respectively. The anodes 38 and 39 of the silicon controlled rectifiers SCR–1 and SCR–2 are connected to the cathode 40 of the rectifying diode 26 for receiving the positive voltage from the AC reference voltage source 28 through its anode 41, depending on the signal received from the AC signal source 10 which in turn depends on relation of the phase of the AC signal from the AC source 10 to the phase of the AC reference voltage 28. That is: if the phase of the AC signal from the source 10 is opposite to the phase of the reference voltage from the source 28, silicon controlled rectifier SCR–1 will fire to produce a positive pulse across resistor R–8; and, if the phase of the AC signal from the source 10 is the same as the phase of the reference voltage from the source 28, silicon controlled rectifier SCR–2 will fire to produce a positive pulse across resistor R–7. These positive pulses will be directed through the alternating current switching circuit G and through the receiving circuit H to a driven circuit 42, as herein more fully described. The driven circuit 42 is part of the fine and coarse circuitry of the copending U.S. application Ser. No. 535,745, as hereinbefore mentioned, and which has a common grounded input-output conductor 43.

The alternating current switching circuit G comprises: an alternating current switching voltage source 44 of one half the frequency of the AC reference voltage source 28 or a frequency of $f_1/2$; and, switching transistors Q–2 and Q–3, which are alternately opened and closed by the alternating voltage from the source 44 at the one half frequency rate of the frequency of the AC reference voltage from source 28 or the frequency of $f_1/2$. The alternating switching will permit driving pulses, received from the reference voltage circuit F, to appear at either output line conduit A or output conduit B, as shown by arrows 46 and 47, depending on whether transistor Q–2 or transistor Q–3 is conducting at that instant. The driving pulses supplied through the conduits A and B can be used to drive the driven circuit 42 which may be, as hereinbefore stated, a shift register, a ring counter or an electronic step integrator as disclosed in the copending U.S. application Ser. No. 411,803. Interconnecting the line conduits A and B are resistors R–9 and R–10 having a common connection to the output line 9 from the AC input signal source 10 and to the ground 16 through a line conductor 48.

As provided in this invention, the cathode 36 of the silicon controlled rectifier SCR–1, besides being connected to the ground 16 through resistor R–8, is connected to the collector terminal 50 of the switching transistor Q–2 and to the collecetor terminal 52 of the switching transistor Q–3. These connections are provided for the transmission through the selectively conducting switching transistors Q–2 and Q–3 of the pulses received by the silicon controlled rectifier SCR–1.

In addition, as illustrated in the drawing, the cathode 37 of the silicon controlled rectifier SCR–2, besides being connected to the ground 16 through the resistors R–7 is connected to the output receiving or clearing circuitry H by a line conductor 54 and as hereinmore fully described.

The output receiving circuitry H primarily comprises: a pair of clearing transistors Q–4 and Q–5; and a delayed circuitry made up of a resistor R–11 and a capacitor C–2. Transistors Q–4 and Q–5 are connected to a pair of clearing line conduits C and D. The line conduit C is connected to the output receiving circuit H to clear one circuit such as the fine circuit of the copending U.S. application Ser. No. 535,745, as shown by arrow 60, and the conduit D is connected to the output receiving circuit H for delayed clearing of another circuit such as the coarse ciruit of the copending U.S. application Ser. No. 535,745, as shown by arrow 61.

More specifically, pulses received from the silicon controlled rectifier SCR–2 of the reference voltage source F are directed through the resistor R–11 to the base 56 of the transistor Q–5 and to the capacitor C–2. Further, the pulses from the silicon controlled rectifier SCR–2 are directed through a resistor R–12 to the base 64 of the transistor Q–4. Connected to the collectors 66 and 67 of the clearing transistors Q–4 and Q–5 are the line conduits C and D respectively for clearing the fine and coarse circuits of the driven circuit 42, as hereinbefore stated. Depending on the signal received from the signal circuit E the driven circuit 42 will be cleared by directing the current through the emitter terminals 68 and 69 of the transistors Q–4 and Q–5, which are connected to the ground 16.

In the operation of this system, a signal from the AC signal source 10 is applied through the coupling capacitor C–1 to the base 13 of the NPN split phase inverter transistor Q–1. When the AC input signal from the source 10 aids the forward bias of the transistor Q–1, that is, the base becomes more positive, the current through the transistor Q–1 increases. The increased current causes junction point 19 to become less positive with respect to ground and the junction point 21 to become more positive with respect to ground.

When the AC input signal from the source 10 opposes the forward bias, the current through the transistor decreases and causes voltage at junction points 19 to become more positive with respect to ground and the junction point 21 to become less positive with respect to ground. This action produces two output signals that are (of reverse phase) 180° out of phase with one to the other. The signal developed at junction point 19 is coupled to the gate electrode 32 of the silicon controlled rectifier SCR–1 through the DC blocking capacitor 22. The signal developed at junction point 21 is coupled to the gate electrode 34 of the silicon controlled rectifier SCR–2 through the coupling capacitor 20.

The transistor Q–1 provides driving pulses of opposite phase to gate electrodes 32 and 34 of the silicon controlled rectifiers SCR–1 and SCR–2. If the phase of the AC input signal from the source 10 is opposite to the phase of the AC reference voltage from the source 28, silicon controlled rectifier SCR–1 will fire to produce a driving pulse across resistor R–8. If the phase of the AC input signal from the source 10 is the same as the phase of the AC reference voltage from the source 28, then silicon controlled rectifier SCR–2 will fire to produce a driving pulse across resistor R–7. Thus either SCR–1 or SCR–2 fires, depending on the phase of the input signal from source 10, SCR–1 fires when the reference voltage from the source 28 and the signal at point 19 are in phase to provide a potential across resistor R–8, and SCR–2 fires when the reference voltage from source 28 and the signal at point 21 are in phase to provide a potential across resistor R–7.

Assuming that the thermocouple, as hereinbefore mentioned, senses a rising temperature, then the AC input signal from source 10 will provide a signal to the transistor Q–1 that would be opposite in phase to the AC reference voltage from source 28, thereby producing driving pulses across resistor R–8. The AC switching voltage source 44 alternately opens and closes the switching transistors Q–2 and Q–3 at a rate corresponding to one half the frequency of the AC reference voltage from the source 28.

The driving pulses will thereupon alternately on the line conduits A and B so that the output of line conduits A and B can then be used to drive the integrator as provided in the copending U.S. application Serial No. 411,803.

The driving signals are alternately directed through line conduits A and B as long as the signal received from the AC input signal source 10 is of opposite phase to the AC reference voltage from source 28 corresponding to an increasing temperature sensed by the thermocouple. In the event the sensed signal decreases, the phase of the AC input signal from source 10 reverses and the silicon controlled rectifier SCR–2 conducts, providing driving pulses across resistor R–7 and provides pulses to the bases 64 and 56 of clearing transistors Q–4 and Q–5. A single pulse will render transistor Q–4 conducting to clear the fine circuit of the driven circuit 42 through line conduit C and through the transistor Q–4 to the ground 16. It should be noted that the continuous pulsation of the current through the delayed circuitry made up of resistor R–11 and capacitor C–2 would provide enough voltage on the base 56 of the transistor Q–5 to render the transistor Q–5 conducting and clear the coarse circuitry of the driven circuit 42 through the conduit D, as shown by arrows 61, through the transistor Q–5 and to the ground 16.

Therefore, as provided in this invention, the emitters 68 and 69 of the transistors Q–4 and Q–5 are connected to the ground 16 in such a way as to clear the fine and the coarse circuitry of the driven circuit 42 as soon as the transistors Q–4 and Q–5 conduct. Thereby, as herein mentioned, the integrator circuitry provided in the copending U.S. application Serial No. 411,803 is cleared by shorting the gates of the silicon controlled rectifiers through the transistors Q–4 and Q–5 when the signal from the AC input source 10 is of the same phase as the reference voltage from source 28, as upon a reduction of temperature sensed by the thermocouple.

In summary, as provided by this circuitry, it is possible to use a sensor to sense a measured quantity and to alternately drive and sequentially increase display segments of an electroluminescent display instrument depending on the closing and opening of a pair of switching transistors. The alternate output will be used to drive a step integrator which would energize the display segments. If the input phase of the sensor is reversed, another pulse would be produced to clear the step integrator circuit to deenergize the electroluminescent segments of the display instrument through clearing circuitry as provided, for clearing the display in small or fine steps or completely clearing the display instrument by a coarse clearing circuit. That is, by turning on clearing transistors, connected in a way hereinbefore described, the fine and coarse circuits of the step integrator would be cleared by shorting the gates of the silicon controlled rectifier. The instantaneous and the delayed clearing features can thus be used, as previously mentioned, where some parts of the circuits are to be cleared instantaneously and some after a predetermined time delay.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An electronic control system for driving and clearing an electronic network for controlling solid state displays comprising, an alternating current input signal means operable for sensing an increasing or decreasing given measured quantity and providing therefrom an alternating current input signal having an amplitude and phase corresponding, respectively, to magnitude and sense of change of the measured quantity, an alternating current reference voltage means connected to said alternating current input signal means and operable for sensing the phase of said alternating current input signal, said alternating current reference voltage means being operable for directing a driving pulse or a clearing pulse to the network depending on the phase of the alternating current input signal received from said alternating current input signal means wherein at one predetermined phase said alternating current reference voltage means is operable for directing a driving pulse to the network controlling the solid state display, and wherein at an opposite phase said alternating current reference voltage means is operable for directing another pulse to the network for clearing the network controlling the solid state display.

2. An electronic control system for driving and clearing a circuit for controlling solid state displays comprising, an alternating current input signal means operable for sensing an increasing or decreasing given measured quantity and for providing therefrom an input signal having an amplitude and phase corresponding, respectively, to magnitude and sense of change of the measured quantity, an alternating current reference voltage means operable at a predetermined frequency for receiving the signal from said alternating current input signal means and thereby directing a first phase driving pulse or a second opposite phase clearing pulse depending on the phase of said signal, an alternating switching voltage means operable at one half the frequency of said alternating current reference voltage means for receiving the driving pulse from said alternating current reference voltage means, and said switching voltage means alternately directing the first phase driving pulse received from said alternating current reference voltage means into one or another conducting path, a driven circuit for controlling the solid state displays, and said controlling circuit being driven by said first phase driving pulse alternately received from said conducting paths for operatively controlling said solid state displays.

3. The combination defined by claim 2 including other means for receiving the second opposite phase clearing pulse from said alternating current reference voltage means for clearing the driven circuit of the effect of the driving pulses on the operative control of the solid state displays by said driven circuit.

4. The combination defined by claim 3 in which said other means includes a first means instantaneously operable upon receiving a single second opposite phase clearing pulse for clearing a part of the driven circuit of the effect of the driving pulses, and second delay action means operable only after receiving several second opposite phase clearing pulses to completely clear the driven circuit of the effects of the driving pulses on the operative control of the solid state displays by said driven circuit.

5. An electronic control system comprising an alternating current input signal means operable for sensing an increasing or decreasing given measured quantity for providing therefrom an input signal having an amplitude and phase corresponding, respectively, to magnitude and sense of change in the measured quantity, a driven network for controlling solid state displays, an alternating current reference voltage means including a pair of control means interposed between said alternating current input signal means and said driven network, said pair of control means being selectively operable for directing the signal received from said alternating current input signal means into one or another electronic path of said driven network depending on the phase of said signal, which in turn depends upon whether the measured quantity is increasing or decreasing, an alternating switching voltage means interposed between one of the control means of said alternating current reference voltage means for connecting one of the electronic paths of said driven network to the increasing signal received from said alternating current reference voltage supply circuit at one predetermined phase for alternately driving said driven network, and a clearing network electronically parallel to said alternating switching voltage means and interposed between the other of the control means of said alternating current reference voltage means for connecting the other electronic path of said driven network to the decreasing signal received from the other control means of said alternating current reference voltage means at a phase opposite to said one predetermined phase for clearing said driven network.

6. The structure defined by claim 5 wherein said alternating switching means comprises, a pair of switching transistors alternately driven to direct the driving pulses alternately into said driven network.

7. The structure defined by claim 5, wherein said alternating current input signal means includes a phase discriminator operable for converting the input signal, depending on the phase of said signal, into a driving pulse or a clearing pulse.

8. The structure defined by claim 7 wherein said phase discriminator is a split phase inverter transistor.

9. The structure defined by claim 7 wherein each of said pair of control means includes a silicon controlled rectifier having a control gate, the control gate of the rectifier of the one control means being connected to said phase discriminator for receiving the converted predetermined phase input signal to provide thereby the increasing driving pulses, and the control gate of the rectifier of the other control means being connected to said phase discriminator for receiving the converted input signal of said opposite phase to provide thereby the decreasing clearing pulses.

10. The structure defined by claim 7 wherein said alternating current reference voltage means further comprises an alternating current voltage means, a rectifying diode for directing positive voltages therethrough from said alternating current voltage means, the one control means including a first silicon controlled rectifier connected to said diode for receiving the positive pulses and having a control gate connected to said phase discriminator for receiving the converted predetermined phase input signal to provide the increasing driving pulses for said driven network, and the other control means including a second silicon controlled rectifier connected to said diode for receiving the positive pulses and having a control gate connected to said phase discriminator for receiving an opposite phase input signal to provide the decreasing pulses for clearing said driven network.

11. The structure defined by claim 10 wherein said clearing network further comprises an instantaneous clearing transistor operable for partially clearing said driven network upon receiving a single clearing pulse from the second silicon controlled rectifier upon said phase discriminator designating that said input signal means sensed a relatively small decreasing measured quantity, another clearing transistor, and a delayed action signal network means operable for rendering said other clearing transistor effective for completely clearing said driven circuit upon receiving several clearing pulses from the second silicon controlled rectifier upon said phase discriminator designating that said input signal means sensed a relatively large decreasing measured quantity.

12. The structure defined by claim 11 wherein said delayed action network includes a capacitor connected between a base element and an emitter element of said other clearing transistor, a resistor connecting the base element of said other clearing transistor to a cathode of said second silicon controlled rectifier, and said other clearing transistor having a collector element connected to the network, said capacitor operable for storing an increasing amount of voltage received from the second silicon controlled rectifier upon an input signal of said opposite phase being applied by said phase discriminator to the control gate of said second silicon controlled rectifier for clearing said driven network through the collector element of said other clearing transistor upon a plurality of input signals of said opposite phase being received from said phase discriminator designating a relatively large decreasing measured quantity.

13. An electronic drive system for alternately opening and closing a driven circuit in controlling a solid state display comprising, an input signal means responsive to a sensed condition, said signal means being operable to provide a first pulse of a predetermined phase upon said signal means being responsive to an increasing sensed condition parameter, and to provide a reversed second pulse out of phase to said first pulse upon said signal means being responsive to a decreasing sensed condition parameter, a direct current supply source, a phase discriminator for converting said pulses to a first or a second path depending upon whether the sensed condition parameter be increasing or decreasing, a switching means operable by said pulses for providing driving pulses upon receiving a signal derived from an increasing sensed condition parameter, and said switching means for providing a clearing pulse upon receiving a signal derived from a decreasing sensed condition paramter, and an alternating driven switching source for directing the driving pulses alternately into two output lines connecting the driven network for alternately driving said network in an increasing sense, and a clearing network including other switching means operable by the clearing pulse for clearing said driven network upon said signal means being responsive to a decreasing sensed condition parameter.

14. An electronic voltage clearing system for clearing a circuit for controlling solid state displays designating a measured parameter acting in an increasing or decreasing sense, comprising, a direct current supply source, a split phase inverter transistor having base, emitter and collector elements, said transistor being operable as a phase discriminator for sensing a pulse acting in one of said senses, said transistor having its collector and emitter elements connected across said direct current supply source and thereby operable to receive a direct current voltage from said direct current supply source upon excitation of its base elements by an input signal acting in one of said senses, a silicon controlled rectifier operable to conduct a control pulse in response to an output pulse from said transistor upon said split phase inverter transistor acting in said one sense, and means responsive to said control pulse to clear said circuit.

15. An electronic voltage output receiving or clearing circuit comprising, a driven circuit to be cleared of stored voltage, a first transistor having a base, emitter and collector elements, the emitter and collector elements of the first transistor being connected to output conductors of said driven circuit, and said emitter and collector elements being operable for clearing voltage from said driven circuit upon a switching on of said first transistor, means operable for producing pulses applied to the base element for switching on said first transistor, a second transistor having a base, emitter and collector elements, the emitter and collector elements of the second transistor being connected to other output conductors of said driven circuit, and said emitter and collector elements of the second transistor being operable for clearing voltage from said driven circuit upon a switching on of said second transistor, a resistor connecting the base element of said second transistor to the pulse producing means, a capacitor connected to said resistor and to the base of said second transistor for storing voltage upon receiving a plurality of pulses from said pulse producing means to thereby act as a delayed clearing circuit means to effectively switch on said second transistor to clear the voltage from said driven circuit through said other conductors only upon a predetermined number of pulses being received by the base of said second transistor from said pulse producing means.

16. An electronic alternating drive and clearing circuit for a network controlling a solid state display comprising, an alternating current input signal means operable for sensing a measured parameter acting in an increasing and decreasing sense, a split phase inverter transistor having a base element operably connected to said alternating current input signal means to be controlled thereby, said split phase inverter transistor operable to direct an output pulse of a predetermined phase when said alternating current input signal means senses an increasing measured parameter and operable to direct another pulse at a phase opposite to said predetermined phase when said alternating current input signal means senses a decreasing measured parameter, a direct current supply source connected to a collector element of said split phase inverter transistor, said transistor having an emitter element connected to ground, an alternating current reference voltage source, a rectifying diode connected to said alternating current reference voltage source operable to direct a positive voltage therethrough, a first silicon controlled rectifier operably connected to said rectifying diode and having a gating electrode connected to the collector element of said transistor for receiving at the gating electrode thereof a signal from said input signal means of the predetermined phase to operate said first silicon controlled rectifier so as to permit alternating current voltage from said alternating current reference voltage source to be conducted therethrough to drive the driven circuit for presenting an increasing display, an alternating switching means operable to direct said alternating current voltage, said switching means having a first switching transistor operable to receive the alternating current voltage and to permit the voltage from said first silicon controlled rectifier to be directed therethrough to the driven circuit, a second switching transistor operable to receive the alternating current voltage of a phase opposite from that directed to the first switching transistor for permitting the alternating current voltage to be directed therethrough to the driven circuit, the driven circuit being operable by the alternating current voltage directed through said first and second switching transistors so as to be alternately driven for providing an increasing display signal, a second silicon controlled rectifier operably connected to said rectifying diode and having a gating electrode connected to the emitter element of said split phase inverter transistor and operable to conduct alternating current voltage therethrough from said alternating current reference voltage source upon receiving at the gating electrode thereof an input signal of a phase opposite to said predetermined phase for presenting a decreasing measured parameter, a clearing circuit receiving the alternating current voltage conducted through said second silicon controlled rectifier upon a decreasing input signal from said alternating current input signal source, said clearing circuit further comprising a first clearing transistor having a base element directly connected to the output from said second silicon controlled rectifier, said first transistor having collector and emitter elements connected to first output conductors of a first portion of said driven circuit, the base element being responsive to the second rectifier output to render the first transistor conductive to permit clearing of said driven circuit upon a single output pulse being received by the base element of the first clearing transistor from said second silicon controlled rectifier for clearing voltage from the first portion of the driven circuit through said first output conductors, and a second clearing transistor operable by a delayed circuit having a resistor, and a capacitor operably connecting a base of said second transistor to the output from said second silicon controlled rectifier, said capacitor operable for building up a control voltage upon a plurality of output pulses being received from the output of said second silicon controlled rectifier, and said second clearing transistor having collector and emitter elements connected to second output conductors of a second portion of said driven circuit, said base element being responsive to the output from the second rectifier for clearing said driven circuit upon a build-up of said output voltage pulses within the delay circuit to a predetermined value to clear voltage from the second portion of the driven circuit through said second output conductors.

References Cited

UNITED STATES PATENTS

| | | | |
|---|---|---|---|
| 3,054,908 | 9/1962 | Galopin ----------- | 307—88.5 |
| 3,109,971 | 11/1963 | Welch et al. ----- | 307—88.5 X |

ARTHUR GAUSS, *Primary Examiner.*

DAVID J. GALVIN, *Examiner.*

D. D. FORRER, *Assistant Examiner.*

UNITED STATES PATENT OFFICE

CERTIFICATE OF CORRECTION

Patent No. 3,333,114 July 25, 1967

Robert J. Molnar et al.

It is hereby certified that error appears in the above numbered patent requiring correction and that the said Letters Patent should read as corrected below.

Column 7, line 35, after "the" insert -- driven --; line 62, for "paramter" read -- parameter --; column 8, line 6, for "elements" read -- element --.

Signed and sealed this 6th day of August 1968.

(SEAL)
Attest:

Edward M. Fletcher, Jr.
Attesting Officer

EDWARD J. BRENNER
Commissioner of Patents